United States Patent [19]
Aagaard et al.

[11] 3,928,730
[45] Dec. 23, 1975

[54] MATRIX MODULE AND SWITCHING NETWORK

[75] Inventors: Einar Andreas Aagaard; Johannes Wilhelmus Coenders; Eise Carel Dijkmans, all of Eindhoven, Netherlands

[73] Assignee: U.S. Philips Corporation, New York, N.Y.

[22] Filed: Oct. 10, 1974

[21] Appl. No.: 513,547

[30] Foreign Application Priority Data

July 1, 1974 Netherlands ...................... 7408823

[52] U.S. Cl. .......................... 179/18 GF; 340/166 R
[51] Int. Cl.[2] ...................... H04G 9/00; H04M 3/00
[58] Field of Search ......... 179/18 GF, 175, 175.2 R; 340/166 R

[56] References Cited

UNITED STATES PATENTS 3,828,314 8/1974 Bradbery et al. ............... 179/18 GF

*Primary Examiner*—Thomas A. Robinson
*Attorney, Agent, or Firm*—Frank R. Trifari; Daniel R. McGlynn

[57] ABSTRACT

A matrix module of integrated construction which is provided with electronic crosspoints, the control gates of which are connected to gate control circuits which are connected to the vertical conductors. Test signal generators, connected to the horizontal conductors, and a test control circuit controlled by the selection signal and controlling the test signal generators, enable test procedures to be performed, free paths to be searched and selected end paths to be established.

11 Claims, 14 Drawing Figures

MATRIX MODULE AND SWITCHING NETWORK

BACKGROUND OF THE INVENTION

1. Field of the invention

The invention relates to a matrix module, comprising electronic crosspoint elements which are arranged at crosspoints of two groups of conductors, separately denoted as horizontal and vertical conductors, and which are each provided with a first main electrode connected to the horizontal conductor and a second main electrode connected to the vertical conductor and also with a control gate, the control gates of the crosspoint elements connected to the same vertical conductor being connected to a gate control circuit which is connected to the vertical conductor.

The invention furthermore relates to a multistage switching network, comprising a number of switching stages which are interconnected by link conductors and which each comprise a plurality of matrix modules, each matrix module comprising electronic crosspoint elements which are arranged at crosspoints of two groups of conductors which are separately denoted as horizontal and vertical conductors, each of the crosspoint elements being provided with a first main electrode connected to the horizontal conductor and a second main electrode connected to the vertical conductor and also with a control gate, the control gates of the crosspoints elements which are connected to the same vertical conductor being connected to a gate control circuit which is connected to the vertical conductor.

Switching networks for telecommunication exchanges may comprise electronic crosspoints such as four-layer diodes or four-layer transistors. Attempts are made to construct the electronic crosspoints and the required control circuits in integrated form in one semiconductor body. It is notably attempted to accommodate one matrix switch together with the required control circuits, together referred to as matrix module, in one integrated unit (chip).

The invention relates to the field of the circuits for matrix modules which are suitable for realization in one integrated unit. A problem in this respect is to minimize the number of terminals of the integrated unit.

2 Description of the state of the art

A crosspoint sub-system for integrated construction is known from Digest of Technical Papers, 1974, IEEE International Solid-State Circuits Conference, pages 120, 121, 238. This sub-system comprises the crosspoints of one vertical of a matrix switch. The crosspoints are formed by four-layer transistors. The subsystem comprises one control input for the crosspoints, one test output, as many signal inputs as there are crosspoints, and one signal output. If a plurality of sub-systems are combined to form one matrix switch, there will be as many control inputs and test outputs per matrix switch as there are sub-systems in a matrix switch. The number of terminals of a matrix switch can then already become too large for matrix switches of small dimensions (limited number of verticals) so as to be realized in an integrated unit.

A matrix switch for integrated construction is known from IEEE Transactions on Communications, Vol. COM-22, No. 3, March 1974, pages 279–287. The crosspoints are formed therein by four-layer transistors. The control gates of the crosspoints of a vertical are connected to a common gate control circuit, which is also connected to the vertical conductor. The number of terminals of such a matrix switch is limited.

However, in a switching network incoporating such matrix switches it is difficult to realize the test procedures required in practice (before, during and after the establishment of the connection) and possibly also the searching and selection of free paths.

SUMMARY OF THE INVENTION

The matrix module according to the invention is characterized in that the matrix module comprises a selection signal input, accessible to a central control unit, and first means for deriving control signals from the selection signal input so as to control the gate control circuits therewith.

It is a further characteristic that the selection signal input has connected thereto a test control circuit for controlling, in reaction to a selection signal, test signal generators which are connected to the horizontal conductors.

It is a further characteristic that the matrix module comprises a sense signal output, accessible to the central control unit, and second means which are connected to the selection signal input and to the vertical conductors for controlling the sense signal output in the presence of a selection signal on the selection signal input and a free signal on at least one of the vertical conductors.

It is another characteristic that the matrix module comprises a marking signal input, accessible to the central control unit, and fourth means for deriving control signals from the marking signal input in order to control the gate control circuits therewith, each gate control circuit comprising fifth means for forming the logic AND-function of the control signals originating from the first and fourth means and a test signal originating from the vertical conductor.

According to the first characteristic, each matrix module comprises an input by means of which the matrix module can be selected; the gate control circuits will be activated only in a selected matrix module.

According to the second characteristic, the selection signal activates test signal generators which pass a test signal on to the horizontal conductors. In a multistage switch network this means that the selection of a matrix module causes test signals to be applied to the matrix modules of the preceding switching stage via the link conductors.

According to the third characteristic, the selection signal activates a sense signal output by means of which it can be determined per matrix module whether a test signal appears on one of the vertical conductors.

According to the fourth characteristic, a marking signal is required to activate the gate control circuits, with the result that test procedures can be performed independent of the establishment of connections.

It is to be noted that the selection signal input, the marking signal input, and the sense signal output may be different physical connections, but that the use of different voltage and/or current levels for the various signals also enables the connection with the central control unit to be established via one conductor.

A second aspect of the invention is formed by a multi-stage switching network. For this aspect of the invention, reference is made to the Claims.

DESCRIPTION OF THE EMBODIMENTS

Figures 1, 2:
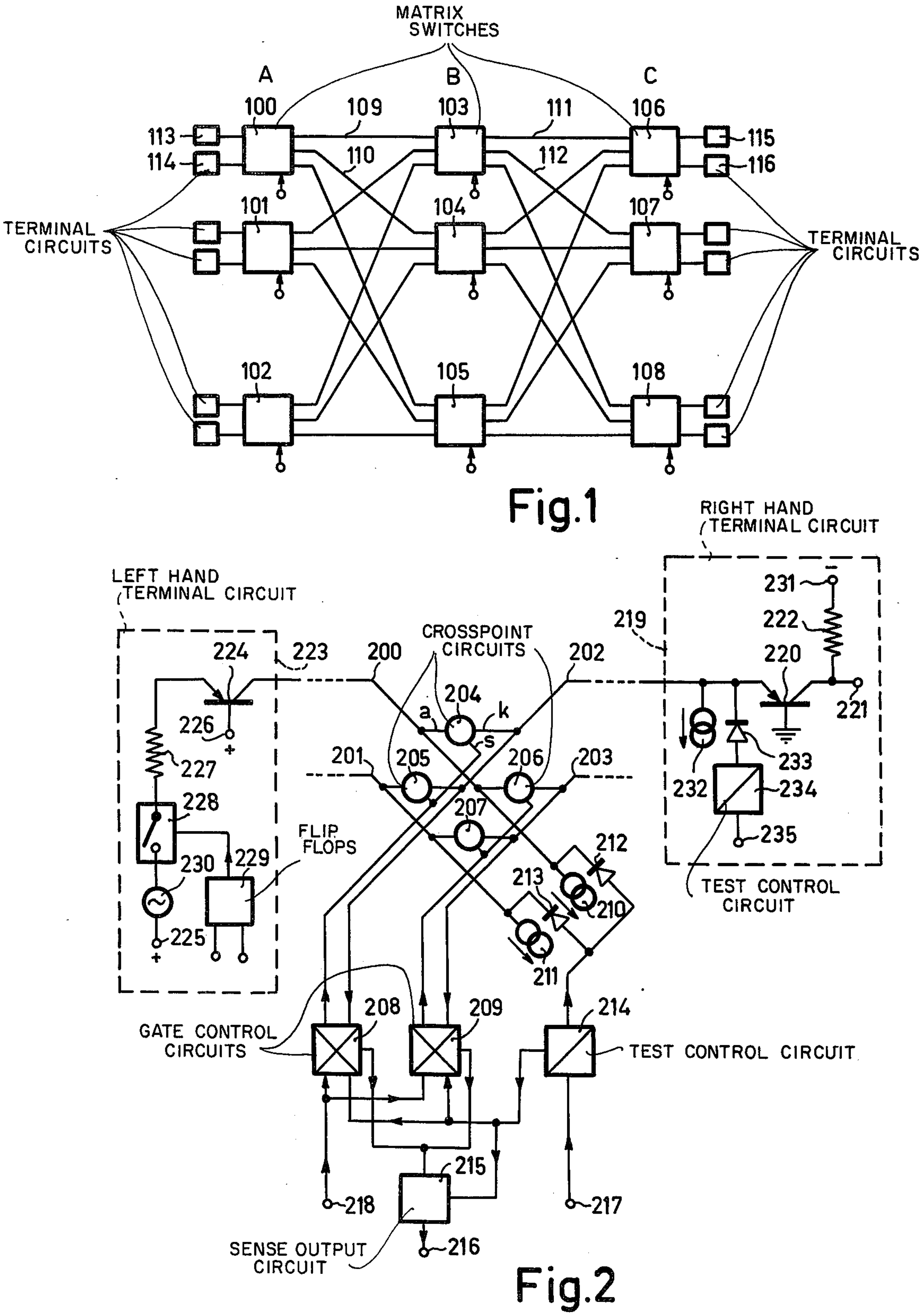
FIG. 1 is a diagram of a multi-stage switching network.
FIG. 2 is a diagram of a matrix module according to the invention, shown between two terminal circuits.

FIG. 1 shows a switching network comprising three stages A, B and C, each of which comprises a plurality of matrix switches, 100, 101 and 102 in stage A, 103, 104 and 105 in stage B, and 106, 107 and 108 in stage C. The stages A, B and C are interconnected by link conductors, 109, 110 etc. between the stages A and B, and 111, 112 etc. between the stages B and C.

The inputs of the matrix switches of stage A have connected thereto terminal circuits 113, 114 etc., and the outputs of the matrix switches of stage C have connected thereto terminal circuits 115, 116 etc. The terms "input" and "output" have no other significance than to make a distinction between the two groups of connections of a matrix switch; they do not relate to the direction of the signal transmission or to the direction in which connections are established. The terminal circuit 113, 114 etc. are referred to as left-hand terminal circuits for obvious reasons, and the terminal circuits 115, 116 are referred to as right-hand terminal circuits.

The central part of FIG. 2 shows a matrix switch with the associated control circuits. The left-hand part of FIG. 2 shows the essential parts of a left-hand terminal circuit, and the right-hand part of FIG. 2 shows the essential parts of a right-hand terminal circuit.

The matrix switch shown in FIG. 2 comprises the inputs 200 and 201 and the outputs 202 and 203. Provided at the crosspoints between the inputs and the outputs are the crosspoint circuits 204, 205, 206 and 207. Each crosspoint circuit is provided with an anode *a*, a cathode *k* and a control gate *s* as shown in FIG. 2 for crosspoint circuit 204. The anodes of the crosspoint circuits are connected to the inputs of the matrix switch, and the cathodes are connected to the outputs of the matrix switch.

The control gates of the crosspoint circuits 204 and 205 are connected to a gate control circuit 208, and the control gates of the crosspoint circuits 206 and 207 are connected to a gate control circuit 209. It is to be noted that the gate control circuit 208 is connected to the crosspoint circuits which are connected to output 202, and that the gate control circuit 209 is connected to the crosspoint circuits which are connected to output 203.

The input 200 has connected thereto a source of constant current 210, while a source of constant current 211 is connected to the input 201. Also connected to the input 200 is a diode 212, while input 201 has connected thereto a diode 213. The diodes 212 and 213 are connected to test control circuit 214.

The matrix switch furthermore comprises a sense output circuit 215 which is connected to the gate control circuits 208 and 209, a sense signal output 216, a selection signal input 217 and a marking signal input 218.

The right-hand terminal circuit 219 comprises a pnp transistor 220, the emitter of which is connected to an output of a matrix switch of stage C (compare FIG. 1), its collector being connected to the signal output 221 and its base being connected to ground. The collector is furthermore connected, via a resistor 222, to a supply point 231 (−). The emitter has connected thereto a source of constant current 232 and a diode 233. The diode is furthermore connected to a test control circuit 234 which is provided with a selection signal input 235.

The left-hand terminal circuit 223 comprises a transistor 224, the collector of which is connected to an input of a matrix switch of stage A (compare FIG. 1), its emitter being connected to a circuit which leads to a supply point 225 (+), its base being connected to a supply point 226 (+). The emitter circuit comprises a resistor 227, an (electronic) switch 228 which is controlled by a flipflop 229, and a signal generator 230. This signal generator represents the source of the signals which are to be transmitted, via a path through the switching network, to a signal output of a right-hand terminal circuit.

The broken line between the output 202 of the matrix switch and the right-hand terminal circuit 219 may be considered as a symbolic representation of the presence of none, one or two stages of the switching network, depending on whether the matrix switch is situated in stage C, stage B or stage A. The same applies to the broken line shown between left-hand terminal circuit 223 and the input 200 of the matrix switch.

It will be obvious that the description given with reference to the matrix switch shown is actually applicable to all matrix switches, no matter in what stage they are situated.

Figure 3:
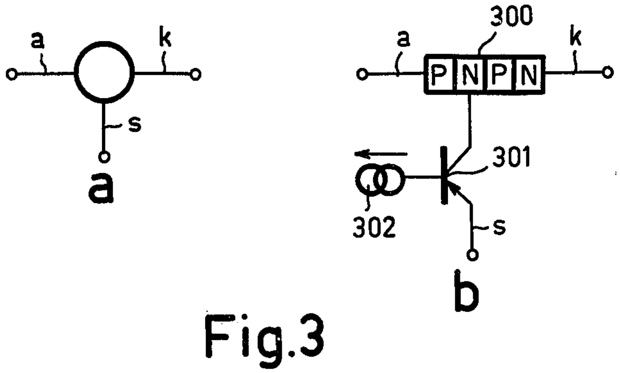
FIG. 3*a* shows the symbol of a crosspoint and FIG. 3*b* shows the diagram of an embodiment of the crosspoint.

FIG. 3 adjacently shows the symbol of a crosspoint circuit and a feasible embodiment thereof. This embodiment is described in detail in U.S. Pat. No. 3,688,051, and will be described herein only in as far as is necessary for proper understanding of the present invention. The crosspoint circuit comprises a pnpn transistor 300, a control transistor 301, and a current source 302. The collector of transistor 301 is connected to the n-region of the pnpn transistor which is situated on the anode side and which acts as a gate for triggering the pnpn transistor.

In the condition in which the crosspoint circuit is not conductive and is not marked, the control gate s receives from the relevant gate control circuit (compare in FIG. 2 the gate control circuits 208 and 209) a positive voltage which is denoted by GIP (gate idle potential). This GIP is more positive than any voltage liable to occur in the switching network, and under these circumstances the pnpn transistor is cut off. The control transistor 301 is then saturated and presents a low impedance to pnpn transistor 300. The collector current of control transistor 301 equals the gate leakage current of pnpn transistor 300.

In order to trigger a crosspoint, a positive voltage, denoted by LMP (link marking potential) and being slightly less positive than the GIP, is applied to the anode *a*. A positive voltage, denoted by GMP and slightly less positive than the LMP, is applied to the control gate *s*. As a result, the voltage between the anode a and the control gate *s* of the marked crosspoint which was initially negative, reverses its sign and now becomes positive. Consequently, the gate current of the pnpn transistor reverses its direction and assumes a value such that the hold current is reduced to zero, with the result that the pnpn transistor constitutes substantially a short-circuit between the anode and the cathode. If it is ensured that in this condition a current of sufficient strength can flow between the anode and the cathode, the pnpn transistor remains conductive, also when the voltage of the control gate *s* is reduced to GIP and the transmission path (extending via the crosspoint circuit) is kept at a positive voltage which is denoted by LCP (link connecting potential) and which is slightly less positive than the GMP.

Figure 4:
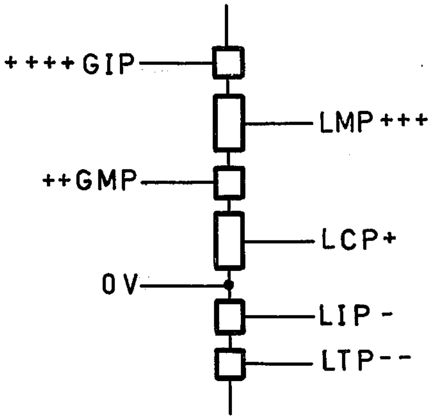
FIG. 4 shows a voltage diagram.

The mutual relationships between the above voltages and the regions in which these voltages are situated is illustrated in FIG. 4. This Figure also shows two negative voltages, i.e., a voltage denoted by LIP (link idle potential) and a voltage deonted by LTP (link test potential). These voltages will be discussed hereinafter. In FIG. 4 the relationship of the value of the positive voltages is denoted by a number of +signs, i.e., the number of +signs is larger as the voltage is higher. The same applies to the negative voltages.

As is shown in FIG. 2, each matrix switch comprises a selection signal input 217. The matrix switch can be selected by means of the selection signal input. The selection signal inputs are generally indicated in FIG. 1.

Let it be assumed first that the route followed by a transmission path through the switching network is known, so that it is known via which matrix switches the transmission path extends. Let us consider, by way of example, a transmission path extending between the terminal circuits 113 and 115 via the matrix switches 100, 104 and 106.

The establishment of the transmission path will be described in detail hereinafter with reference to FIG. 2, in which terminal circuit 223 will be taken as a representative of the terminal circuit 113, the terminal circuit 219 as a representative of the terminal circuit 115, and the matrix switch successively as the representative of the matrix switches 100, 104 and 106.

The switch 228 in the terminal circuit 223 is closed by suitable control of flipflop 229, with the result that transistor 224 is saturated and the collector assumes the voltage of the supply point 226. The input 200 of matrix switch 100, consequently, receives the potential LMP. The continuity of the collector current of transistor 224 is ensured by the current source 210. The diode 212 is blocked in these circumstances.

The selection signal input 217 of the matrix switches 100, 104 and 106 and the selection signal input 235 of terminal circuit 115 receive a selection signal which activates various circuits in the matrix switches and the terminal circuit. First of all, the test control circuits 214, 234 are made to reduce the clamp potential LIP +Vj (Vj is the junction voltage) applied to the diode to LTP +Vj (compare FIG. 4). Secondly, the gate control circuits 208 and 209 which are connected to the test control circuit 214 are set to the state in which they are sensitive to the potential LTP on the relevant output of the matrix switch.

The operation of the current sources 210, 211 and the diodes 212, 213 and the test control circuit 214 will be described hereinafter.

The current source 210 and the diode 212 together constitute a test signal generator 210–212; a test signal generator 211–213 is similarly formed by the current source 211 and the diode 213.

When the test circuit 214 applies the potential LIP +Vj to the diodes 212 and 213, the inputs 200 and 201 cannot have a potential which is lower than LIP. An input which does not form part of a completely or partly established transmission path, and hence is free, will assume the potential LIP.

A link conductor which is busy has the potential LCP or LMP.

When test circuit 214 applies the potential LTP +Vj to the diodes 212 and 213, the inputs 200 and 201 will assume the potential LTP only if they are free. This potential, indicating that an input is free, constitutes a so-termed "free signal" which is one of the possible output signals of the test signal generators 210–212, 211–213. For example, if the input 200 is busy and test control circuit 214 applies the potential LTP +Vj to diode 212, the diode 212 will remain blocked (at the given polarity) because the potential of input 200 is LCP or LMP and because this potential is more positive than LTP. The switching over of the potential by the test control circuit, consequently has no effect whatsoever on busy inputs.

It is to be noted that, when input 200 is busy, the current source 210 makes a contribution to the current in the transmission path incorporating input 200. This contribution, however, is constant and is not influenced by the test control circuit 214, so that it has no disturbing effect whatsoever.

The gate control circuits of the selected matrix switch in the preceding stage are in the state in which they are sensitive to the potential LTP. Because the link conductor connecting matrix switch 106 to matrix switch 104 and the link conductor connecting matrix switch 104 to matrix switch 100 are assumed to be free, these link conductors will assume the potential LTP. Furthermore, the output of matrix switch 106 connected to terminal circuit 115 receives the potential LTP from this terminal circuit.

In the switching network the potential LTP is thus adjusted on the link conductors and on the output of the desired transmission path, and the potential LMP is adjusted on the input of the transmission path. In each of the selected matrix switches 100, 104 and 106 the gate control circuits 208 and 209 have been made sensitive to the potential LTP, and one of these gate control circuits actually detects the potential LTP on an output of the matrix switch. It will be assumed that this is the output 202 of the matrix switch shown in FIG. 2.

The potential LTP on the output 202 of matrix switch 100, the operation of which will be considered first, is detected by the gate control circuit 208. A marking signal is subsequently applied to the marking signal input 218 which is connected to the gate control circuits 208 and 209.

In reaction to the presence of the potential LTP on the output 202, the selection signal on input 217 and the marking signal on input 218, the gate circuit 208 decreases the potential of the control gates *s* of the crosspoint circuits 204 and 205 from the potential GIP to GMP. The input 200 has the potential LMP, with the result that the crosspoint circuit 204 is triggered and changes over to the conductive state. As a result, the potential of output 202 is increased from LTP to LMP. The gate control circuit 208 reacts thereto by adjusting the potential of the control gates of the crosspoint circuits 204 and 205 to GIP.

The continuity of the current through the cross-point circuit 204 is ensured by the current source 210, 211 of the selected matrix switch of the next stage, in this case the matrix switch 104. This current has a value such that the crosspoint circuit 204 remains conductive after the potential of the control gate s has returned to GIP.

From output 202 of matrix switch 100 the potential LMP is transferred to an input of the matrix switch 104 of the next stage, via the link conductor 110. In this matrix switch the operation as described above for matrix switch 100 is repeated after application of a marking signal to the marking signal input 218 of matrix switch 104. Subsequently, this procedure is repeated in matrix switch 106, after a marking signal has been applied to the marking signal input 218 thereof.

When the crosspoint circuit of a matrix switch of stage C becomes conductive, it is to be noted that the potential of the transmission path decreases from LMP to LCP due to the fact that the transistor 220 in the right-hand terminal circuit 219 becomes conductive. Due to the decrease of the potential of the transmission path to LCP, no branching can occur from this transmission path to other link conductors. Add-on on a busy link conductor is also precluded because such a conductor cannot assume the potential LTP.

The marking signal inputs 218 of the matrix switches of a given stage can be parallel connected. This can be done because a gate control circuit can be activated only if also a selection signal is applied to the matrix switch. The presence of the marking signal input enables a stepwise establishment of a transmission path, i.e., first in stage A, subsequently at a controlled instant in stage B, and subsequently in stage C. However, the function of the marking signal can be combined with that of the selection signal. In that case, after the application of the selection signals to the selected matrix switches and the right-hand terminal circuit and the closing of the switch 228 in the left-hand terminal circuit, the transmission path is switched through substantially simultaneously in all stages.

The use of a separate marking signal input (which may be common to all matrix switches per stage), however, offers advantages if supervision of the establishment of a transmission path is desired, and if the switching network must also perform functions related to the searching of free connection paths.

The matrix switch shown in FIG. 2 comprises a facility for testing link conductors as regards their being free or busy, the said facility being usable, in conjunction with a central control unit, for serching free transmission paths, for testing the establishment of the connection and for traffic supervision.

When a matrix switch has been selected, the gate control circuit 208 and 209, detecting the potential LTP on the relevant output of the matrix switch, apply, via the sense output circuit 215, a sense signal to the sense signal output 216. The sense signal outputs of the matrix switches of a given stage can be parallel connected. This may be done because a matrix switch can supply a sense signal only if it has been selected. A sense signal appearing on the common sense signal output can then be directly related to the selected matrix switch.

The testing of the link conductors connected to the outputs of a matrix switch can be effected as follows. The relevant matrix switch is selected and the matrix switches of the next stage are subsequently selected one after the other. As a result, the outputs of the first matrix switch which are connected to free link conductors successively assume the potentials LTP. When it is noted at which selective matrix switch of the next stage the sense signal output of the relevant stage supplies a sense signal, the free outputs of the selected matrix switch of this stage can be determined.

The testing of the link conductors connected to the inputs of a matrix switch can be effected as follows. The matrix switch is selected, and subsequently the matrix switches of the preceding stage are selected one after the other. When it is noted at which selected matrix switches of this stage the sense signal output of this stage supplies a sense signal, the free inputs of the selected matrix switch of the relevant stage can be determined.

The operation described above can be readily verified on the basis of FIG. 2 and FIG. 1, and will not be further elaborated herein.

A simple procedure for searching a free transmission path will be briefly described hereinafter. The right-hand terminal circuit of the transmission path is selected and subsequently the matrix switches of stage C are successively selected. It is noted which matrix switches supply a sense signal, and subsequently these matrix switches are simultaneously selected. (A right-hand terminal circuit can be connected to a plurality of matrix switches of stage C). The same is effected in stage B, and subsequently in stage A. The potential LTP which is applied to the switching network by the right-hand terminal circuit, thus branches out through the switching network to the left-hand terminal circuits, where it can be detected. It can then be determined if the potential LTP occurs in a given left-hand terminal circuit, or a left-hand terminal circuit can be determined in which the potential LTP occurs.

After it has been determined that a free transmission path is available, a free transmission path must be selected from the various possibilities. To this end, the selection signals are removed in a given stage, for example, starting with stage A, after which they are restored one after the other until the potential LTP is again detected in the left-hand terminal circuit. The same process is repeated in stage B and subsequently in stage C. The number of selected matrix switches in each stage is thus reduced to one, and the transmission path can be established in the manner described above.

Figure 5:
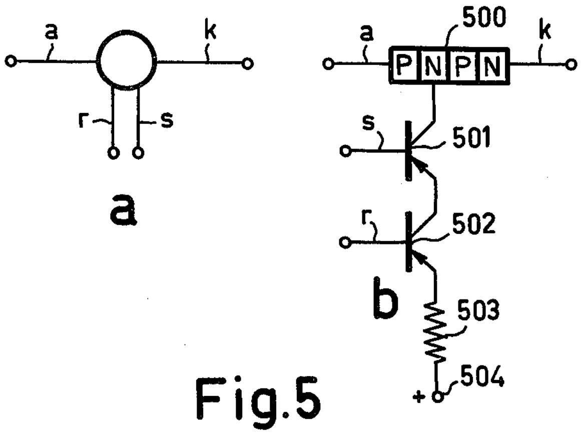
FIG. 5*a* shows the symbol of a crosspoint.
FIG. 5*b* shows the diagram of an embodiment of the crosspoint.

FIG. 5 adjacently shows the symbol of an alternative version of a crosspoint circuit and the construction of this crosspoint circuit. The symbol of FIG. 5*a* differs from that of FIG. 3*a* by the presence of a reference voltage input *r*. The crosspoint circuit shown in FIG. 5 comprises, in addition to the pnpn transistor 500, two cascade-connected transistors 501 and 502. The emitter of transistor 502 is connected, via a resistor 503, to a supply point 504 (+). The control gate *s* is connected to the base of transistor 501, and the reference voltage input *r* is connected to the base of transistor 502. The latter acts as a source of constant current for transistor 501.

Figure 6:
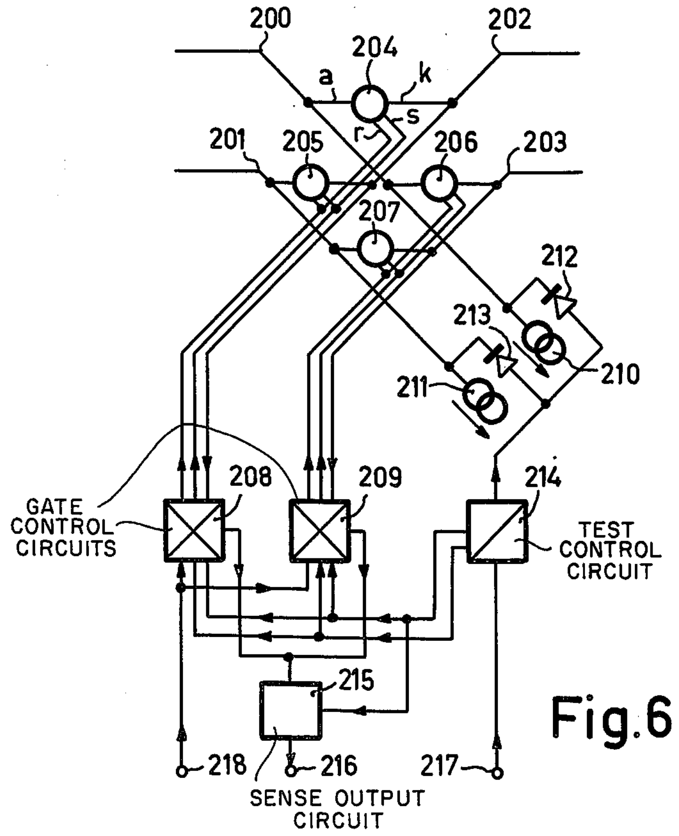
FIG. 6 shows the diagram of a matrix module according to the invention, comprising crosspoints as shown in FIG. 5.

FIG. 6 shows the construction of a matrix switch comprising the crosspoint circuits of FIG. 5, parts corresponding to FIG. 2 being denoted by the same references. In this embodiment the reference voltage inputs *r* of the crosspoint circuits 204 and 205 are connected to gate control circuit 208, and those of the crosspoint circuits 206 and 207 are connected to the gate control circuit 209.

It is to be noted that the functional behavior of the crosspoint circuit of FIG. 5 does not differ from that of FIG. 3. The embodiment of FIG. 5 offers advantages in view of the realization in integrated circuits and as regards the transmission properties.

FIG. 6 shows a second connection between the test control circuit 214 and the gate control circuit 208 and 209. This additional connection is present in the practical circuit realization for the supply of a given reference voltage to the gate control circuits.

Figure 7A:
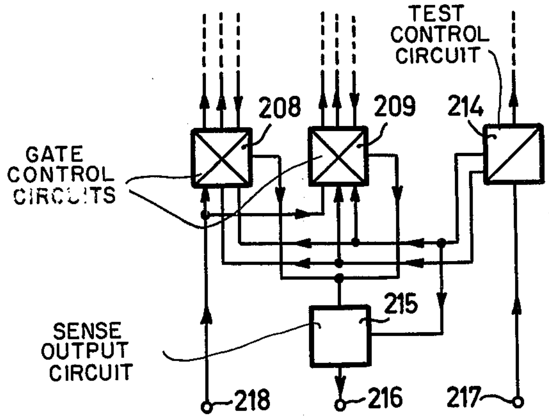
FIG. 7*a* shows the same as the lower part of FIG. 6.
Figure 7B:
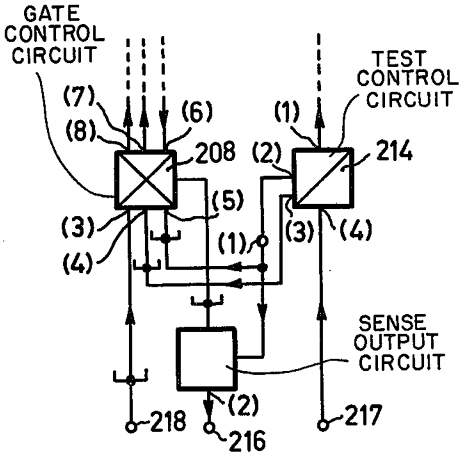
FIG. 7*b* is a simplified representation of the same part.

FIG. 7 adjacently shows the circuits and their interconnections as shown in the lower part of FIg. 6, and a representation in which the gate control circuit 209 has been omitted. The connections to the gate control circuit 209 and any further gate control circuits are represented in FIG. 7 by multiple signs.

Figure 8A:
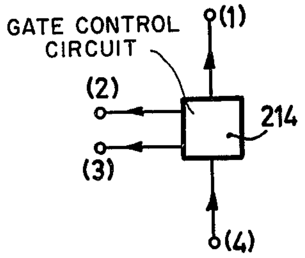
FIG. 8*a* shows the test control circuit of FIG. 7*b*.
Figure 8B:
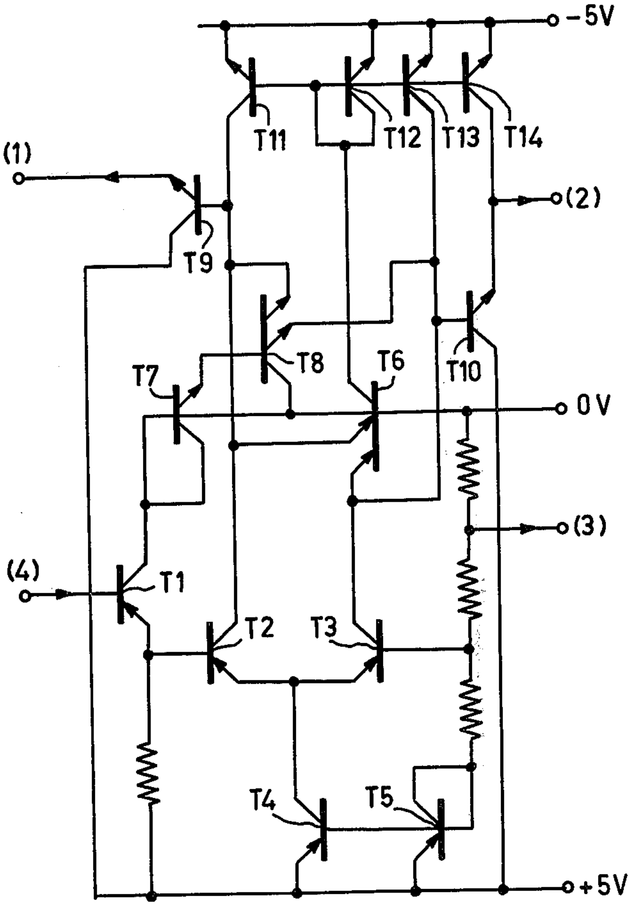
FIG. 8*b* shows the diagram of the electronic embodiment thereof.

FIG. 8 adjacently shows the symbol of the gate control circuit 214 (compare FIG. 7*b*) and an embodiment thereof.

The selection signal which is received on input (4) is applied, via the emitter follower T1, to the difference voltage amplifier T2-T3.

The collector voltages of the transistors T2 and T3 are limited to +Vj (=junction voltage) by transistor T6 or to −2Vj by the transistors T7 and T8. The level of the signals of the outputs (1) and (2) is OV ("1") or −3Vj ("0"). The output (2) is "1" in the presence of a selection signal on input (4); the output (1) is then "0". The potential applied to the diodes 210 and 211 (FIG. 6) by input (1) thus amounts to OV or −3Vj, so that LIP = −Vj and LTP = −4Vj.

The transistors T11, T13 and T14 in FIG. 8 serve as sources of constant current, and the transistor T12 serves as a voltage reference for these current sources. Transistor T4 serves as a current source having the transistor T5 as a reference. The transistors T9 and T10 serve as output stages. A reference voltage of 1.6 V is derived from a voltage divider and is applied to output (3).

Figure 9A:
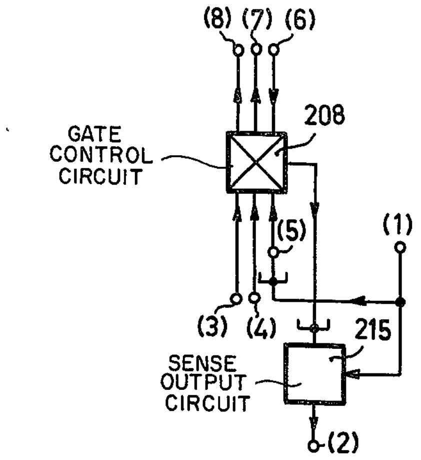
FIG. 9*a* shows the gate control circuit and the sense output circuit of FIG. 7*b*.

FIG. 9 adjacently shows the symbols of the gate control circuit 208 and the sense output circuit 215 (compare FIG. 7*b*) and an embodiment thereof.

The sense output circuit 215 is formed by the resistor RO and the transistor TO. The reference voltage of 1.6 V is applied to the input (4).

Figure 9B:
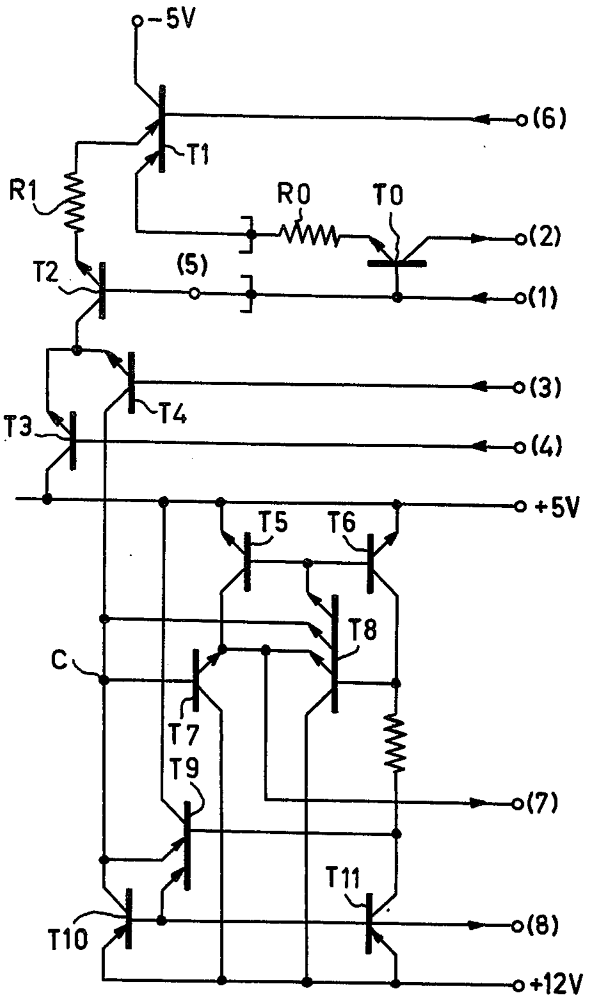
FIG. 9*b* shows the diagram of the electronic embodiment of these circuits.

Different situations will yet be considered to explain the operation of the circuit of FIG. 9*b*.

1. when input (1) is "0" (−3Vj) or if input (1) is "1" (OV) and input (6) does not have the potential LTP (−4Vj) (FIG. 4), transistor T1 is not conductive and no sense signal appears on output (2). The point C is clamped to 12V - Vj by transistor T9, and the output (7) has the potential GIP = 12V-2Vj via transistor T7.

2. when input (1) is "1" (OV) and input (3) is "0" (OV) and input (6) has the potential LTP, a current flows via transistor T1, resistor RO and transistor TO to the sense signal output (2).

A current also flows via transistor T1, resistor R1, transistor T2 and transistor T3, with the result that the output (7) remains at the potential GIP.

3. when input (1) is "1" (OV) and input (3) is "1" (>3.1V), and input (6) has the potential LTP (−4Vj), a current flows via transistor T1, resistor RO and transistor TO to the sense signal output (2).

A current also flows via transistor T1, resistor R1, transistor T2 and transistor T4. This current dominates the collector current of the transistor T10 which acts as a current source, with the result that the potential of point C is clamped to 5V + Vj, determined by the transistors T8 and T6. There are now two possibilities for the output (7).

a. none of the crosspoints connected to output (7) receives the potential LMP on its anode. The output (7) is then at the potential GMP = 5V+Vj, determined by the transistors T8 and T6.

b. the potential LMP is present on the anode of one of the crosspoint circuits connected to the output (7). The crosspoint circuit is then triggered and a current flows via the output (7). The current flowing via output (7) is limited by transistor T5, and the output (7) receives the potential LMP −2Vj via the crosspoint circuit. The crosspoint circuit becomes conductive and the input (6) receives the potential LMP, with the result that transistor T1 interrupts the current flowing via sense signal output (2). The transistors T2 and T4 also become currentless, with the result that output (7) returns to the potential GIP.

The output (8) has a potential of 12V−Vj via transistor T11, which serves as a reference voltage for the crosspoint circuits and for the transistor T10 which acts as a current source.

What is claimed is:

1. A matrix module, comprising electronic crosspoint elements which are arranged at crosspoints of two groups of conductors, separately denoted as horizontal and vertical conductors, and which are each provided with a first main electrode connected to the horizontal conductor and a second main electrode connected to the vertical conductor and also with a control gate, the control gates of the crosspoint elements connected to the same vertical conductor being connected to a gate control circuit which is connected to the vertical conductor, wherein the matrix module comprises a selection signal input, accessible to a central control unit, and first means for deriving control signals from the selection signal input so as to control the gate circuits therewith.

2. A matrix module as claimed in claim 1, wherein the selection signal input has connected thereto a test control circuit for controlling, in response to a selection signal, test signal generators which are connected to the horizontal conductors.

3. A matrix module as claimed in claim 1, wherein the matrix module comprises a sense signal output, accessible to the central control unit, and second means which are connected to the selection signal input and to the vertical conductors for controlling the sense signal output in the presence of a selection signal on the selection signal input and a free signal on at least one of the vertical conductors.

4. A matrix module as claimed in claim 3, wherein the said second means comprise test signal discriminators in the gate control circuits and third means for deriving control signals from the selection signal input in order to control therewith a common sense output circuit which is connected to the said test signal discriminators.

5. A matrix module as claimed in claim 2, wherein each of the test signal generators comprises a source of constant current which is connected to the horizontal conductor and a clamp circuit with controllable clamp voltage which is also connected to the horizontal conductor.

6. A matrix module as claimed in claim 1, wherein the matrix module comprises a marking signal input, accessible to the central control unit, and fourth means for deriving control signals from the marking signal input in order to control the gate control circuits therewith, each gate control circuit comprising fifth means for forming the logic AND-function of the control signals originating from the first and fourth means and a free signal originating from the vertical conductor.

7. A matrix module as claimed in claim 6, wherein each gate control circuit comprises sixth means for deriving control signals from the fifth means in order to control the control gates therewith.

8. A multi-stage switching network comprising a number of switching stages which are interconnected by link conductors, each switching stage comprising a plurality of matrix modules, each matrix module comprising electronic crosspoint elements which are arranged at crosspoints of two groups of conductors which are separately denoted as horizontal and vertical conductors, each of the said crosspoint elements being provided with a first main electrode which is connected to the horizontal conductor and a second main electrode which is connected to the vertical conductor, and with a control gate, the control gates of the crosspoint elements which are connected to the same vertical conductor being connected to a gate control circuit which is connected to the vertical conductor, wherein each matrix module comprises an individual selection signal input, selectively accessible for a central control unit, and first means for deriving control signals from the selection signal input in order to control the gate control circuits therewith.

9. A multi-stage switching network as claimed in claim 8, wherein each matrix module comprises a sense signal output which is accessible to the central control unit, each matrix module also comprising second means which are connected to the control signal input and the vertical conductors in order to control the sense signal output in the presence of a selection signal on the selection signal input and a free signal on at least one of the vertical conductors.

10. A multi-stage switching network as claimed in claim 8, wherein each matrix module comprises a marking signal input which is accessible to the central control unit, each matrix module comprising fourth means for deriving control signals from the marking signal input in order to control the gate control circuits therewith, each gate control circuit comprising fifth means for forming the logic AND-function of the control signals originating from the first and fourth means and a free signal originating from the vertical conductor.

11. A multi-stage switching network as claimed in claim 8, wherein the horizontal conductors of the matrix modules of each of the switching stages and the vertical conductors of the matrix modules of the last switching stage have connected thereto controllable test signal generators.

* * * * *

UNITED STATES PATENT AND TRADEMARK OFFICE
CERTIFICATE OF CORRECTION

PATENT NO. : 3,928,730

DATED : December 23, 1975

INVENTOR(S) : EINAR A. AAGAARD ET AL

It is certified that error appears in the above–identified patent and that said Letters Patent are hereby corrected as shown below:

On the Title page, section [57], line 9, change "end" to --and--.

Signed and Sealed this

*eighth* Day of *June 1976*

[SEAL]

*Attest:*

RUTH C. MASON
*Attesting Officer*

C. MARSHALL DANN
*Commissioner of Patents and Trademarks*